US012509639B2

(12) United States Patent
De Angelis et al.

(10) Patent No.: US 12,509,639 B2
(45) Date of Patent: Dec. 30, 2025

(54) REMOVAL OF ACID GASES FROM GASEOUS MIXTURES CONTAINING THEM

(71) Applicant: ENI S.P.A., Rome (IT)

(72) Inventors: Alberto Renato De Angelis, San Donato Milanese (IT); Gianluca Fiori, San Donato Milanese (IT); Filomena Castaldo, San Donato Milanese (IT)

(73) Assignee: ENI S.P.A., Rome (IT)

( * ) Notice: Subject to any disclaimer, the term of this patent is extended or adjusted under 35 U.S.C. 154(b) by 90 days.

(21) Appl. No.: 18/254,514

(22) PCT Filed: Nov. 23, 2021

(86) PCT No.: PCT/IB2021/060849
§ 371 (c)(1),
(2) Date: May 25, 2023

(87) PCT Pub. No.: WO2022/112934
PCT Pub. Date: Jun. 2, 2022

(65) Prior Publication Data
US 2024/0002742 A1  Jan. 4, 2024

(30) Foreign Application Priority Data
Nov. 25, 2020 (IT) ........................ 102020000028301

(51) Int. Cl.
*C10L 3/10* (2006.01)
*B01D 53/14* (2006.01)
*B01D 53/52* (2006.01)
*B01D 53/62* (2006.01)
*B01D 53/78* (2006.01)
*B01D 53/96* (2006.01)

(52) U.S. Cl.
CPC .......... *C10L 3/104* (2013.01); *B01D 53/1425* (2013.01); *B01D 53/1462* (2013.01); *B01D 53/1468* (2013.01); *B01D 53/1475* (2013.01); *B01D 53/1493* (2013.01); *B01D 53/526* (2013.01); *B01D 53/62* (2013.01); *B01D 53/78* (2013.01); *B01D 53/96* (2013.01); *C10L 3/103* (2013.01); *B01D 2252/2023* (2013.01); *B01D 2252/2053* (2013.01); *B01D 2252/2056* (2013.01); *B01D 2252/504* (2013.01); *B01D 2257/304* (2013.01); *B01D 2257/504* (2013.01); *B01D 2258/0283* (2013.01)

(58) Field of Classification Search
CPC ..... C10L 3/104; C10L 3/103; B01D 53/1425; B01D 53/1462; B01D 53/1468; B01D 53/1475; B01D 53/1493; B01D 53/526; B01D 53/62; B01D 53/78; B01D 2252/2023; B01D 2252/2053; B01D 2252/2056; B01D 2252/504; B01D 2257/304; B01D 2257/504; B01D 2258/0283; B01D 2252/2041; B01D 2252/20436; B01D 2256/24
See application file for complete search history.

(56) References Cited

U.S. PATENT DOCUMENTS

| | | | | |
|---|---|---|---|---|
| 4,871,468 A | * | 10/1989 | Jeffrey | B01D 53/1493 252/190 |
| 4,959,086 A | * | 9/1990 | Van Baar | B01D 53/1493 423/228 |
| 2007/0148069 A1 | * | 6/2007 | Chakravarti | B01D 53/1493 423/220 |
| 2010/0285560 A1 | | 11/2010 | Wang et al. | |
| 2010/0326276 A1 | * | 12/2010 | Blair | B01D 53/1462 95/205 |
| 2012/0060686 A1 | | 3/2012 | Kortunov et al. | |
| 2012/0061614 A1 | * | 3/2012 | Calabro | B01D 53/1475 423/229 |
| 2013/0243676 A1 | * | 9/2013 | Siskin | B01D 53/1462 423/228 |

(Continued)

FOREIGN PATENT DOCUMENTS

| | | |
|---|---|---|
| CN | 106566299 A | 4/2017 |
| KR | 20140139821 A | 12/2014 |

(Continued)

OTHER PUBLICATIONS

Translation of KR 2014/0139821 (Year: 2014).*
International Search Report and Written Opinion for International Application No. PCT/IB2021/060849, dated Jan. 26, 2022, 12 pages.
Usubharatana et al., "Enhancement factor and kinetics of CO2 capture by MEA-methanol hybrid solvents", Energy Procedia 1 (2009) 95-102.
Ali et al., "Kinetic study of reactive absorption of some primaryamines with carbon dioxide in ethanol solution", Separation and Purification Technology 18 (2000) 163-175.
Alvarez-Fuster et al., "Chemical Kinetics of the Reaction of CO2 With Amines in Pseudo m-nth Order Conditions Inpolar and Viscous Organic Solutions", Chemical Engineering Science 36 (1981) 9:1513-1518.

(Continued)

*Primary Examiner* — Ali Z Fadhel
(74) *Attorney, Agent, or Firm* — CANTOR COLBURN LLP

(57) ABSTRACT

An acid gas absorbing mixture and a process for the removal of acid gases from gaseous mixtures containing them, such as natural gas, air and flue gases and
 an absorbent mixture usable for the removal of acid gases from gaseous mixtures containing them includes
 at least one diol of general formula $R(OH)_2$ having a normal boiling point equal to or greater than 100° C.;
 at least one organic base having a $pK_b$ (in water) lower than or equal to 3; and
 a polar aprotic solvent having a dielectric constant $\varepsilon$ at 25° C. greater than or equal to 30, a viscosity $\mu$ at 25° C. lower than or equal to 40 cP (centipoise).
 The organic base/diol weight ratio is lower than or equal to 0.6, and
 the aprotic solvent/diol weight ratio is between 0.05 and 0.6.

9 Claims, No Drawings

(56) References Cited

U.S. PATENT DOCUMENTS

2015/0367281 A1* 12/2015 Puxty ................ B01D 53/1475
423/228
2017/0081275 A1* 3/2017 Grandjean ......... B01D 53/1468
2018/0257022 A1 9/2018 Ingram et al.

FOREIGN PATENT DOCUMENTS

| WO | 2018203835 A1 | 11/2018 |
| WO | 2020053116 A1 | 3/2020 |

OTHER PUBLICATIONS

Hammer et al., Natural Gas vol. A17, pp. 73-124, accessed Jun. 29, 2023.
Ishikawa, "Superbases for Organic Synthesis: Guanidines, Amidines, Phosphazenes and Related Organocatalysts", 2009 John Wiley & Sons, Ltd. ISBN: 978-0-470-51800-7, 13 pages.
Ruhnau et al., "A variational approach for particle tracking velocimetry", Meas. Sci. Technol. 16 (2005) 1449-1458.

* cited by examiner

REMOVAL OF ACID GASES FROM GASEOUS MIXTURES CONTAINING THEM

CROSS-REFERENCE TO RELATED APPLICATIONS

This application is a 35 U.S.C. § 371 National Stage patent application of PCT/IB2021/060849, filed on 23 Nov. 2021, which claims the benefit of Italian patent application 102020000028301, filed on 25 Nov. 2020, the disclosures of which are incorporated herein by reference in their entirety.

TECHNICAL FIELD

The present disclosure relates to a process for the removal of acid gases (sour gases according to the most used terminology) from gaseous mixtures containing them.

In particular, the present disclosure relates to a process for the removal of acid gases present in natural gas, in air and in flue gases.

BACKGROUND

Acid gases such as for example $CO_2$, $H_2S$, COS or mixtures thereof are contained in many gases or gaseous mixtures that are present in the natural environment (air) or produced industrially. The presence or emission of acid gases is detrimental as these gases are responsible for many harmful or damaging phenomena such as corrosion, acid rain, poisoning, lung diseases, the greenhouse effect, etc. Their control and/or their elimination is an issue that is more topical than ever in terms of safety and the fight against climate change.

Natural gas, for example, typically contains acid gases that are suitably eliminated in order to remove toxic substances ($H_2S$, COS), increase the calorific value ($CO_2$ removal), reduce corrosion problems ($H_2S$) and remove foul-smelling substances ($H_2S$ and mercaptans).

Natural gas, as reported in the article "Natural gas" by G. Hammer et al., in volume 17 of Ulmann's Encyclopedia of Industrial Chemistry, usually consists of methane as the main component, accompanied by other hydrocarbons, both aliphatic and to a lesser extent aromatic. Other non-hydrocarbon components of methane are: nitrogen, carbon dioxide, $H_2S$, mercaptans and helium. It can be noted, for example, that there are gases (Groeningen in the Netherlands) in which the $H_2S$ content is below the threshold limit (1 ppm by volume), while in other gas fields, like the one in Ekofisk in Norway, the $H_2S$ content is 100 ppm by volume, rising to 8% by volume in the gas fields in Oldenburg in Germany, to 16% in the gas fields in Tenguiz in Russia and to 90% in the gas fields in Bearberry in Canada. By convention, natural gases are defined as "super sour" if they exhibit a $H_2S$ content greater than 30% by volume.

A large amount of $CO_2$ is produced in industrial processes and in combustion, e.g. in diesel or Otto cycle (petrol) engines, in cement factories, in the steel industry, in thermal power stations and released into the environment where it, contributes to increasing the warming of the biosphere.

The selective absorption of $H_2S$ and/or $CO_2$ has recently become the subject of an increasing number of study and research projects and industrial implementations, particularly in the field of natural gas purification and emission abatement, as well as in the purification of non-hydrocarbon gases, such as the gases deriving from coal gasification processes and the tail gases of the Claus plants.

Numerous methods and cycles of abatement of the acid gases have been proposed in the past, the efficiency of which can reach a residual content of acid gas in the purified gas stream of the order of ppm and, in some cases, of the order of ppb.

The most used washing systems for gaseous mixtures to remove the acid gases present therein consist of a treatment with an aqueous solution of amines, whose composition is dependent on the relative content of $CO_2$ and/or $H_2S$, followed by a possible treatment for the removal of mercaptans, in particular for natural gas, depending on the quantity in which they are present (such as absorption on sieves or treatments with highly alkaline solutions, followed by oxidation with cobalt complexes). For example, aqueous solutions of methyldiethanolamine (MDEA) are used, which are resistant to both thermal and chemical degradation, are non-corrosive and have a low heat of reaction with $H_2S$ and $CO_2$. In addition, MDEA mixes poorly with hydrocarbons and does not form carbamates like primary and secondary amines, due to the absence of nitrogen-bound hydrogen atoms. Washing with MDEA solutions is therefore of great importance in the purification of gases with high concentrations of acid compounds due to the low operating energies required, high productivity and excellent stability. Its main disadvantage is the lower propensity to absorb $CO_2$. Where a high percentage of carbon dioxide removal is also required, the addition of one or two more reactive amines, either primary or secondary (MEA, i.e. methylethylamine or DEA, i.e. diethylamine), is possible, which can greatly improve the total reaction rate of the solution without affecting the advantageous properties of MDEA. In this case, of course, the process costs increase and the degradation of primary amines, which are thermally less stable than MDEA, increases.

As an alternative to aqueous solutions of alkanolamines for $CO_2$ absorption, a number of liquid absorption systems based on other solvents have been proposed. Alkanolamines and amines have been combined with alcohols, diols and cyclic carbonates in various publications, to form "hybrid solvents" whose reaction mechanisms and kinetics have been studied in the literature, for example in Alvarez-Fuster, et al., Chem. Ing. Sci. 1981, 36, 1513; Ali, et al., Separation and Purification Technology 2000, 18, 163; Usubharatana, et al., Energy Procedia 2009, 1, 95; and Nov. 15, 2017 2 Park, et al., set. Sci. Technol. 2005, 40, 1885.

Ionic liquids are another non-aqueous solvent currently under development. They generally consist of pairs of ions that are in a liquid state near room temperature in the absence of other solvents. They have low regeneration requirements (temperature, energy), but have not surpassed the aqueous amine solutions in terms of performance due to factors such as low $CO_2$ carrying capacity at low pressures and the high viscosity, besides having a high cost, which has so far hindered its industrial development for such use.

The use of a non-aqueous liquid solvent to separate $CO_2$ from gaseous mixtures containing water vapour can lead to the accumulation of $H_2O$ in the liquid solution both as a single-phase and two-phase solution, depending on the process conditions (e.g. pressure, temperature, concentration of $H_2O$) and the affinity of the non-aqueous solvent for $H_2O$. The accumulation of $H_2O$ is detrimental to the $CO_2$ separation and purification process, as more energy is required for solvent regeneration due to the need to continuously remove water from the solvent.

Another group of non-aqueous liquids that have been proposed to solve many of the problems involved in the separation of $CO_2$ from gaseous mixtures containing it are the ionic liquids that are switchable at room temperature. They are equimolar mixtures of amidine or guanidine nitrogenous bases and alcohols, which, as such, constitute non-ionic liquids at room temperature, but form ionic liquids by reaction with $CO_2$ at room temperature. Typically, the conductivity of the switchable ionic liquids increases by one or two orders of magnitude when $CO_2$ is added.

It is important to underline that these solvents allow higher $CO_2$ loads than some aqueous amines and are regenerable under milder conditions.

$CO_2$ is captured through the formation of alkyl carbonates according to the following reaction mechanism:

The mechanism indicated in the reaction above is possible for a generic molecule of formula $XO_2$, where X is, like in the previous case, C or X=S or N.

Patent application US2012/060686 describes a system for absorbing $CO_2$ from gaseous mixtures coming from combustion which uses the combination of a strong nitrogenous base such as DBU or guanidine and a lower basic alkylamine, such as aniline or piperidine, possibly in the presence of organic solvents such as toluene, tetrahydrofuran or dimethyl sulfoxide (DMSO). The text mentions the formation of carbamates during $CO_2$ absorption.

On the other hand, the formation of carbonates or carbamates is not possible for other acid molecules present in natural gas such as $H_2S$, which can still be captured by salification, given the high basicity of some of the compounds used in the technique for the formation of ionic liquids, but in often unsatisfactory quantities, especially in the case of high $H_2S$ concentrations and/or the requirement to obtain low residual $H_2S$ concentrations, e.g. below 1000 ppm.

Ionic liquids also have the disadvantage of significantly increasing their viscosity when the concentration of $CO_2$ or other absorbed acid gas is very high, thus making the separation process more costly in terms of the pressures and energy required to handle them.

A process capable of effectively removing the acid gases (sour gases) from a gaseous source such as for example natural gas, allowing even higher absorption efficiency, less increase in fluid viscosity during absorption and easy subsequent separation of the gases, e.g. at relatively low temperatures, to allow an easy regeneration and recycling of the washing solution in industrial processes, has been proposed by the Applicant in the international application published under number WO 2020/053116 A1. The process described therein makes use of a composition comprising: a) at least one alcohol of general formula $R(OH)_n$; b) at least one strong organic base (super-base); c) a polar aprotic solvent.

The process described in WO 2020/053116 A1 allows the removal of all acid gases and possibly other undesirable substances such as mercaptans to be obtained in a single step, simplifying the plant layout, avoiding strong alkaline substances (corrosive and with high environmental impact) and requiring also less energy to regenerate the absorbent solution.

Although the process described above was found to be efficient in eliminating acid gases from a natural gaseous mixture, a drawback was highlighted related to the fact that the composition for extracting acid gases led also to the extraction of a certain amount of C1-C5 hydrocarbons. Natural gas is thus depleted of essential components, which results in a significant economic damage.

SUMMARY

The Applicant has been able to develop a composition for treating acid gases and a related process for treating acid gases using such a composition, which solves the aforementioned problem and has further advantages over the prior art.

According to a first aspect, the present disclosure provides a composition for treating acid gases, specifically an absorbent mixture, as defined in the appended claims.

A second aspect of the present disclosure is a process for treating natural gas as defined in the appended claims.

The text of the claims must be considered included in the description for the purpose of assessing the sufficiency of the description.

DETAILED DESCRIPTION OF THE DISCLOSURE

Therefore, an object of the present disclosure is an absorbent mixture usable for the removal of acid gases from gaseous mixtures containing them, in particular natural gas, comprising:
A) at least one diol of general formula $R(OH)_2$ having a normal boiling point equal to or greater than 100° C., wherein R is an alkyl group, linear or branched, possibly substituted, having a number of carbon atoms comprised between 2 and 8;
B) at least one organic base having a $pK_b$ (in water) lower than or equal to 3, preferably lower than or equal to 2;
C) a polar aprotic solvent having a dielectric constant ε at 25° C. greater than or equal to 30, a viscosity μ at 25° C. lower than or equal to 40 cP (centipoise), preferably lower than or equal to 20 cP, and a normal boiling point equal to or greater than 140° C.,
and wherein
the organic base/diol weight ratio is lower than or equal to 0.6 and preferably greater than or equal to 0.25,
the aprotic solvent/diol weight ratio is comprised between 0.05 and 0.6.

Embodiment of the claimed disclosure in which the term "comprising" is to be interpreted as "consisting essentially of" or "consisting of", even if not explicitly stated, shall also be deemed to fall within the scope of this patent application.

Mixtures however obtained between two or more of said elements shall also be deemed to fall within the scope of the definition of any component or compound comprising more than a single element, unless otherwise specified.

In this description and in the claims, the term "normal boiling point" means the boiling temperature of a liquid at a pressure of 0.1013 MPa (1 atm).

Unless otherwise specified, the extreme values of the numerical ranges, however defined, are to be deemed to fall within the scope of the range.

In preferred embodiments, the organic base/diol weight ratio is comprised between 0.45 and 0.55, or is comprised between 0.45 and 0.5.

In preferred embodiments, the aprotic solvent/diol weight ratio is comprised between 0.08 and 0.5, more preferably between 0.08 and 0.2.

In the absorbent mixture of the present disclosure, the ratio between the moles of OH groups of the diol A) and the moles of base B) in the reaction mixture is preferably comprised between 10/1 and 6/1, more preferably comprised between 8/1 and 6/1.

In preferred embodiment, the diol R(OH)$_2$ has an alkyl group R comprised between 2 and 3 carbon atoms. More preferably, the diol R(OH)$_2$ is selected from ethylene glycol, propylenic glycol and 1,3-propandiol.

Said organic base B) of the absorbent mixture in accordance with the present disclosure may generally be selected from strong organic bases having low volatility, i.e., generally having a normal boiling point at least greater than 100° C., preferably greater than 130° C., more preferably comprised between 130° C. and 300° C.

Preferably said organic base B) has a pK$_b$ comprised between 0.3 and 2, more preferably comprised between 0.5 and 2, wherein pK$_b$, according to the known definition in chemistry, means the antilogarithm of the dissociation constant of said organic base B) in water.

Preferably said organic base B) is a nitrogenous organic compound having a low volatility, comprising from 5 to 25, preferably from 5 to 20, C atoms and from 1 to 10, preferably from 2 to 6, N atoms.

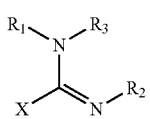
(I)

Conveniently said organic base B) has the following general formula (I):

wherein:

R$_1$ is a linear or branched C1-C5 alkyl group; or is an aryl group having from 6 to 10 carbon atoms, optionally substituted with a linear or branched C1-C5 alkyl group; or together with X it forms a 5 to 9 membered saturated or unsaturated cycle;

R$_3$ is a linear or branched C1-C5 alkyl group; or is an aryl group having from 6 to 10 carbon atoms, optionally substituted with a linear or branched C1-C5 alkyl group; or together with R$_2$ it forms a 5 to 7 membered cycle;

X is the —NR$_4$R$_5$ group, or a linear or branched C1-C5 alkyl group, or X may represent a group of formula (II):

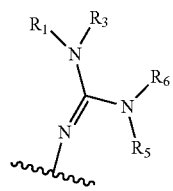
(II)

R$_2$ is hydrogen, a linear or branched C1-C5 alkyl group; or together with R$_3$ it forms a 5 to 7 membered cycle comprising at least two nitrogen atoms; or it is an aryl group having from 6 to 10 carbon atoms, optionally substituted with at least one linear or branched C1-C5 alkyl group; or it is a C7-C12 alkyl group, such as, for example, benzyl;

or R$_2$ may represent a group of formula (III):

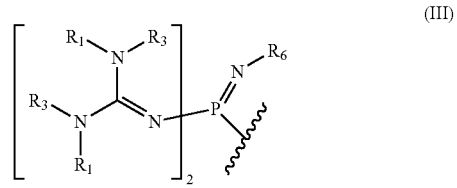
(III)

wherein:

the graphic symbol "represents the group in formula (I) to which X or R$_2$ is bound;

R$_4$ is a linear or branched C1-C5 alkyl group;

R$_5$ is a linear or branched C1-C5 alkyl group;

R$_6$ is hydrogen or a linear or branched C1-C5 alkyl group; and mixtures thereof.

The aryl group means phenyl or naphthyl.

In a preferred aspect of the present disclosure R$_1$, R$_3$, R$_4$, R$_5$ and R$_6$ correspond to a methyl group and R$_2$ is hydrogen or methyl.

The organic bases of formula (I) are conveniently selected for example from 1,8-diazabicyclo (5.4.0) undec-7-ene (DBU) [pK$_b$ 1.1], 1,5-diazabicyclo[4.3.0]non-5-ene (DBN) [pK$_b$ 0.5], 1,1,3,3-tetramethylguanidine (TMG) [pK$_b$ 0.4], derivates of biguanide (1-(diaminomethylidene)guanidine such as N''-[(dimethylamino) (methylimino)methyl]-N,N,N',N'-tetramethyl-guanidine, 1,8-bis-(tetramethyl-guanidino) naphthalene, compounds of the phosphazene type such as N'',N'''',N'''''''-phosphinimylidinetris[N,N,N',N'-tetramethylguanidine], or mixtures thereof as shown below.

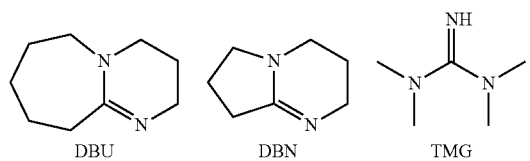

N''-[(dimethylamino)(methylimino)methyl]-N,N,N',N'-tetramethyl-g

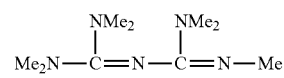

1,8-bis-(tetramethyl-guanidino) naphthalene

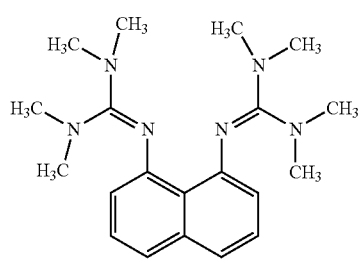

N'',N'''',N''''''-phosphinimylidinetris[N,N,N',N'-tetramethylguanidine]

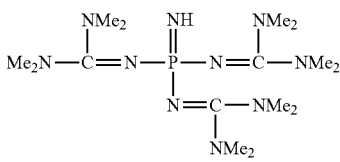

Other organic bases B) suitable for the present disclosure are, for example, quinuclidine (1-Azabicyclo[2.2.2]octane) HA pKb=3, and 1,8-bis(tetramethylamino) naphthalene (N,N,N',N'-tetramethyl-1,8-diaminonaphthalene).

Numerous examples of possible organic bases can be found in the literature reference: "Superbase for organic synthesis" edited by T. Ishikawa, ed. Wiley and sons, 2009.

The polar aprotic solvent C) comprised in the absorbent mixture in accordance with the present disclosure is an organic or inorganic compound, preferably organic, preferably liquid at a temperature of 15° C., having the following essential characteristics:
- dielectric constant $\epsilon$ at 25° C. greater than or equal to 30, preferably comprised between 35 and 60;
- a viscosity $\mu$ at 25° C. lower than or equal to 40 cP, preferably lower than or equal to 20, and
- a boiling temperature at normal pressure equal to or greater than 140° C., preferably greater than 150 C.

Polar aprotic solvents C) suitable for the formation of the absorbent mixture of the present disclosure can be selected by the person skilled in the art from the liquids (at 15° C.) having the above characteristics and which are not reactive towards one of the components present in the gaseous mixture to be treated for the removal of acid gases. For example, they must not result in a hydrolysis reaction if placed in contact with water.

Sulfoxides, sulfones, amides and nitro aromatic compounds are preferred as classes of compounds.

Among the polar aprotic solvents, dimethyl sulfoxide (DMSO), sulfolane (SO), N,N dimethylformamide (DMF), N,N dimethylacetamide (DMA) and nitrobenzene (NB), preferably sulfolane, the characteristics of which are shown in Table 1 below, are particularly preferred for the present disclosure.

TABLE 1

| Polar aprotic solvent | $\epsilon$ (at 25° C.) | Boiling T (at ambient P) | $\mu$ (at 25° C. in cPcP) |
|---|---|---|---|
| DMSO | 47 | 189 | 3.9 |
| SO | 43 | 287 | 10 |
| DMA | 38 | 166 | 3.7 |
| DMF | 37 | 153 | 3.9 |
| NB | 34 | 211 | 4.0 |

In a particularly preferred embodiment of the disclosure, the absorbent mixture of the disclosure comprises:
- A) 1,2-propandiol or 1,3-propandiol in weight percentage comprised between 55% and 65%;
- B) diazabicycloundecene (DBU) in weight percentage comprised between 25% and 35%;
- C) sulfolane in weight percentage comprised between 5% and 15%, wherein, the B/A weight ratio is lower than or equal to 0.6.

The absorbent mixture in accordance with the present disclosure is usable for carrying a process for the removal of acid gases from a gaseous mixture containing them, which is also an object of the present disclosure, comprising the following steps in sequence:
- (a) contacting said gaseous mixture, at a temperature comprised between 0° C. and 70° C. and preferably at a pressure comprised between 50 kPa and 15 MPa, with a solvent system comprising an absorbent mixture in accordance with the present disclosure to obtain a purified gaseous mixture and a liquid solution comprising at least a part of said acid gases;
- (b) separating the purified gaseous mixture from said liquid solution obtained in step (a);
- (c) regenerating the solvent system usable in step (a) and forming a separate gaseous mixture comprising said acid gases, preferably by heating said liquid solution separated in step (b).

The above-mentioned process for the removal of acid gases can be carried out in a continuous or batch reactor, according to the known technical process. The absorption step (a) can be carried out in any apparatus conventionally used for this purpose such as an absorption tower, an autoclave or others. The person skilled in the art can easily size the apparatuses on the basis of the known knowledge for this type of unitary operation and of the characteristics of the solvent system used in the disclosure (viscosity, absorption capacity at saturation, etc.).

With the process, which is the subject-matter of the present disclosure, the removal of all undesired substances is obtained in a single step, with a simplification of the plant layout, and requiring also less energy for the regeneration of the absorbent mixture.

The process for the removal of undesired acid gases by absorption in the solvent system comprising the absorbent mixture of the present disclosure takes place in step a) by treating the starting gaseous mixture with said solvent system, at temperatures comprised between 0° C. and 70° C., preferably between 1° and 60° C., and at pressures comprised between 50 kPa and 15 MPa, preferably between 100 kPa and 5 MPa. The gaseous mixture is purified (so-called softened), by removing undesired substances, and can then be used in the desired manners. In continuous industrial applications, at a steady state, the solvent system fed in step (a) is preferably largely formed by the solvent system regenerated in step (c) of this process, except for the possible make-up part. Said solvent system may comprise, in addition to the absorbent mixture in accordance with the present disclosure, also a residue of acid gases not separated in step (c). It is also possible that the solvent system used in step (a) also comprises up to 20% by volume of an inert diluent other than the polar aprotic solvent, in order to further improve the low viscosity characteristics of the mixture. Suitably, such diluent is selected from the aliphatic or aromatic organic liquids, miscible with the absorbent mixture of the present disclosure, having a boiling temperature greater than 120° C., preferably greater than or equal to 150° C.

The process in accordance with the present disclosure may therefore comprise an optional additional step (d) in which said solvent system regenerated in step (c) is recycled to said step (a).

In step (a), the solvent system and the gaseous mixture containing the acid gases are conveniently contacted according to one of the methods known for extraction and absorption processes of this type, either in equicurrent or countercurrent, by dispersing the gaseous mixture in the liquid in order to maximise the contact between the two phases, for example by stirring and dispersion of the gas in the liquid or by dripping and nebulising the liquid in the gas. The contact time of the two phases can be selected by the person skilled in the art on the basis of known absorption kinetic parameters, or by means of simple preliminary measurements, and is normally comprised between 1 and 100 minutes, preferably between 2 and 30 minutes.

The amount of acid gases absorbed in step (a) may vary within wide limits depending on the characteristics of the solvent system, the pressure and concentration of the acid gases in the fed gaseous mixture, as well as on the system temperature and the contact time. In general, it is carried out in such a way as to bring the solvent system close to the degree of saturation in the selected operating conditions and in such a way that in the purified gaseous mixture there is the least possible quantity of residual acid gas, preferably below the maximum values allowed in the specification.

In step (a) $H_2S$, if any, must be removed from the purified gaseous mixture up to very low final values, in many cases not exceeding 10 ppm.

In step (b) of the process in accordance with the present disclosure, the separation of the purified gaseous mixture from the liquid solution formed by absorption of the acid gases in the solvent system is carried out. This separation of step b) can also take place at the same time as the absorption reaction a), in a single specially designed reactor, in which, for example, the gaseous mixture containing the acid gases is fed from below and placed in continuous countercurrent contact with the absorbent mixture fed at the head of the reactor and flowing downwards by gravity. In a second embodiment, not limiting the present disclosure, the two-phase mixture formed by mixing the gaseous mixture with the solvent system may be separated in a chamber other than the absorption chamber, possibly with the support of a centrifugation system.

In step (c) of the process according to the present disclosure, the liquid solution obtained in step (b), or in steps (a)+(b) simultaneously, is treated so as to regenerate the solvent system usable in step (a) and form a separate gaseous mixture containing the acid gases.

According to a preferred embodiment, in step (c) the liquid solution coming from step (b) is heated to temperatures that are sufficient to remove the desired amount of acid gases, preferably comprised between 70° C. and 180° C., more preferably between 80° C. and 150° C., even more preferably between 90° C. and 130° C.

The solvent system thus regenerated, containing the absorbent mixture, can be recycled at the absorption step (a). Optionally, the person skilled in the art may also use in step (c) a stream of inert gas, such as nitrogen or methane, to favour the removal of acid gases from the liquid solution.

Step (c) can be conveniently carried out at a pressure lower than that of step (a) to favour the removal of the absorbed gas. In some cases, the person skilled in the art may also carry out step (c) at a temperature substantially equal to that of step (a) or slightly higher, but operating at lower pressures than step (a) or even applying pressures lower than the atmospheric one (under vacuum). According to a preferred embodiment, step (c) may comprise a rapid evaporation (better known by the term "flash") of the acid gases contained in the liquid solution, by means of a rapid decrease in pressure under adiabatic or semiabatic conditions. The liquid mixture cools, releasing heat for the separation of the acid gases. This embodiment is particularly convenient when the liquid mixture separated in step (b) is at relatively high temperatures, preferably comprised between 4° and 70° C. For this purpose, the present process may optionally comprise a step of preheating the liquid solution between step (b) and step (c) to temperatures between 7° and 150° C.

The person skilled in the art conveniently selects the absorption temperatures of step (a) and desorption temperatures of step (c) as a function of the characteristics of the solvent system used, preferably so that the absorption temperature is lower than the desorption temperature, more preferably with a difference of at least 20° C.

Step (c) is conveniently carried out so that all or most of the acid gas contained in the liquid solution separated in (b) is removed and separated. Normally, over 90%, preferably over 95% of the gas present in said liquid solution is separated in step (c).

For example, in step (c), conveniently, not all $CO_2$ is removed from the regenerated absorbent mixture, but a small amount, generally from traces up to 1.9% by weight with respect to the weight of the regenerated solvent system, can remain absorbed in the solvent system, in order not to have to use very high desorption conditions and therefore to make the process more economically convenient.

The process subject-matter of the present disclosure, as previously illustrated, makes it possible to reduce the content of acid gases in a gaseous mixture up to values lower than 1000 ppm, preferably lower than 500 ppm, more preferably lower than 100 ppm, the quantities being calculated by volume, assuming the ideality of the gaseous mixtures. In the event that the acid gas is or comprises $H_2S$, the process of the present disclosure advantageously allows to target the specification values for natural gas, as well as for exhaust or combustion gases, with a reduced energy consumption. In fact, it was surprisingly found that the amount of acid gas absorbed in step a), with the same volume of absorbent mixture, is much greater than expected on the basis of the rule of additivity of the single components.

In other words, a volume composed, for example, of a litre of DBU, propandiol, sulfolane mixture, in proportions by weight of 30/60/10, absorbs much more acid gas than a litre of sulfolane.

Also with respect to the absorbent mixture described in WO 2020/053116 A1 of the same Applicant, the absorbent mixture of the present disclosure enables a further improvement in the absorption of acid gases, specifically of $CO_2$.

Again with respect to WO 2020/053116 A1, the absorbent mixture of the present disclosure solves the technical problem inherent in the mixture of such prior art, in that the absorption of C1-C5 hydrocarbons is minimised, as will be shown later in the experimental part.

The process in accordance with the present disclosure is also usable for the removal of other undesired compounds present in natural gas such as for example mercaptans, up to values lower than 30 ppm, preferably lower than 15 ppm, more preferably lower than 5 ppm.

A further advantage of the process of the present disclosure is that the solution used for the absorption of sour (acid) gas can be regenerated at lower temperatures than those conventionally applied for the regeneration of amine solutions, with significant energy savings.

Other relevant advantages over the previous absorbent mixtures, including the one described in WO 2020/053116 A1, are:
- the elimination of foaming during the regeneration phase,
- the loss of diols during the regeneration phase, thanks to their high boiling point, which is both economically and environmentally beneficial,
- the reduction or elimination of the dehydration treatment downstream of softening, as diols have a high dehydrating action, which makes it possible to reduce the construction and operating costs associated with the dehydration unit required in the state-of-the-art plants.

The following embodiment examples are provided merely to illustrate the present disclosure and should not be construed in a sense that would limit the scope of protection defined by the claims.

Examples

Solvents and Reagents
Sulfolane (>99%; Sigma-Aldrich)
1,8-diazabicyclo(5.4.0)undec-7-ene (DBU; >99%; Sigma-Aldrich)
1-hexanol (>99%; Sigma-Aldrich)
1,3-propandiol (>99%; Sigma-Aldrich)
Acid Gas (G) with the Following Composition:

TABLE 2 composition of the gas used for comparison [% vol]

| $CO_2$ | $H_2S$ | $N_2$ | Ethane | Propane | i-C4 | n-C4 | i-C5 | CH4 |
|---|---|---|---|---|---|---|---|---|
| 5.7 | 100 ppm | 0.8% | 13.2% | 5.7% | 2.15% | 0.63% | 0.57% | 71.54% |

Example 1: Absorption of Acid Gas with DBU-Hexanol-Sulfolane Base/Alcohol 0.77, Aprotic Solvent/Alcohol 1 (Comparative, According to WO 2020/053116)

In an autoclave with a capacity of 500 cc, 28 g (0.184 moles) of DBU, 36 g (0.353 moles) of hexanol and 36 g of sulfolane (0.300 moles) are loaded. The mixture is stirred and the autoclave closed, the vacuum is applied at room temperature, and then the mixture is heated to 40° C. The free volume of the autoclave is then filled with gas G at a pressure of 30 bar and gas absorption is noted. The autoclave is reloaded with gas G at 30 bar until the pressure remains constant. The absorbent mixture is recovered, is regenerated as described above and then the content of extracted C1-C5 hydrocarbons present in the recovered gas is analysed.

Example 2: Absorption of Acid Gas with DBU-1,3-Propandiol-Sulfolane Base/Alcohol 0.5, Aprotic Solvent/Alcohol 0.17

The experiment of example 1 is repeated using an absorbent mixture consisting of 30 g (0.197 mol) of DBU, 60 g (0.780 mol) of 1,3-propandiol and 10 g (0.083 mol) of sulfolane. The absorbent mixture is recovered, is regenerated as described above and then the content of extracted C1-C5 hydrocarbons present in the recovered gas is analysed.

Table 3 below shows data for comparing the composition of example 1 with that of example 2, in terms of extraction of C1-C5 hydrocarbons from the initial gaseous mixture.

TABLE 3

Absorption of C1-C5 hydrocarbons (in g/kg of absorbent mixture) by the absorbent mixture of the examples 1 and 2

| Example mixture | Methane | Ethane | Propane | i-butane | n-butane | i-pentane |
|---|---|---|---|---|---|---|
| Ex. 1 | 6.0 | 5.1 | 9.5 | 6.4 | 2.6 | 4.2 |
| Ex. 2 | 0.7 | 1.3 | 3.5 | 1.4 | 0.7 | 0.2 |

As can be seen from the data shown in Table 3, the absorbent mixture according to the disclosure (example 2) enables the absorption of C1-C5 hydrocarbons to be significantly reduced compared to the mixture with hexanol (example 1) according to the prior art (WO 2020/053116).

Example 3—Absorption of Acid Gases from a Gaseous Hydrocarbon Mixture—Comparison Between the Mixture of the Disclosure and Mixture in Accordance with WO 2020/053116

The experiment of example 1 was repeated using two samples of hydrocarbon gas containing methane, $CO_2$ (15 and 16.5% by volume, respectively), $H_2S$ (0.42% and 0.01% by volume, respectively) and operating with the following absorbent mixtures:

1) DBU 28% by weight; hexanol 36% by weight; sulfolane 36% by weight (according to the teachings of WO 2020/053116)
2) DBU 28% by weight; 1,3-propandiol 62% by weight; sulfolane 10% by weight (according to the disclosure)

The treatment conditions were: T approx. 40° C.; pressure approx. 30 bar.

The results are shown in Table 4.

TABLE 4

Absorption of acid gases from hydrocarbon gases

| Absorbent mixture | $CO_2$ (absorption %) | $H_2S$ (absorption %) |
|---|---|---|
| 1 | 88-89% | 100% |
| 2 | 91-100% | 100% |

From the above results, it can be seen that the mixture according to the disclosure allows to obtain a higher percentage absorption of the acid gases, specifically of $CO_2$, contained in the starting hydrocarbon gas, in some cases lowering their content up to undetectable levels.

Example 4 (Comparative)—Absorption of Acid Gases from Sulfolane

The experiment of example 2 was repeated but using only sulfolane in an amount equal to the total amount of the absorbent mixture of example 2.

The result, in terms of the mass ratio between absorbed CO2 and CO2 contained in the incoming gas, is equal to 15.8%.

Finally, it is understood that further modifications and variations may be made to the process and compositions as described and illustrated herein which are not specifically mentioned in the text, but which are to be considered as obvious variations of the present disclosure within the scope of the appended claims.

The invention claimed is:

1. An absorbent mixture usable for the removal of acid gases from gaseous mixtures containing them, the absorbent mixture comprising:
   A) at least one diol of general formula $R(OH)_2$ having a normal boiling point equal to or greater than 100° C., wherein R is an alkyl group, linear or branched, possibly substituted, having a number of carbon atoms comprised between 2 and 8;
   B) at least one organic base having a $pK_b$ (in water) lower than or equal to 3;
   C) a polar aprotic solvent having a dielectric constant F at 25° C. greater than or equal to 30, a viscosity p at 25° C. lower than or equal to 40 cP (centipoise), and a normal boiling point equal to or greater than 140° C., and wherein
      the organic base/diol weight ratio is lower than or equal to 0.6,
      the aprotic solvent/diol weight ratio is comprised between 0.05 and 0.6,
      wherein the polar aprotic solvent is selected from dimethyl sulfoxide (DMSO), sulfolane (SO) and nitrobenzene (NB), preferably sulfolane.

2. The absorbent mixture according to claim 1, wherein the organic base/diol weight ratio is comprised between 0.45 and 0.55, or is comprised between 0.45 and 0.5.

3. The absorbent mixture according to claim 1, wherein the aprotic solvent/diol weight ratio is comprised between 0.08 and 0.5, or between 0.08 and 0.2.

4. The absorbent mixture according to claim 1, wherein the ratio between the moles of OH groups of the diol A) and the moles of base B) in the reaction mixture is comprised between 10/1 and 6/1, or is comprised between 8/1 and 6/1.

5. The absorbent mixture according to claim 1, wherein the diol $R(OH)_2$ has an alkyl group R comprised between 2 and 3 carbon atoms, or the diol $R(OH)_2$ is selected from the group consisting of ethylene glycol, propylenic glycol, and 1,3-propandiol.

6. The absorbent mixture according to claim 1, wherein said organic base B) has a $pK_b$ lower than or equal to 2, or comprised between 0.3 and 2, or comprised between 0.5 and 2.

7. The absorbent mixture according to claim 6, wherein said organic base B) is a nitrogenous organic compound having a low volatility, comprising from 5 to 25, C atoms and from 1 to 10, N atoms, or the organic base B) is selected from the group consisting of 1,8-diazabicyclo (5.4.0) undec-7-ene (DBU) [$pK_b$ 1.1], 1,5-diazabicyclo[4.3.0]non-5-ene (DBN) [$pK_b$ 0.5], 1,1,3,3-tetramethylguanidine (TMG) [$pK_b$ 0.4], derivates of biguanide (1-(diaminomethylidene)guanidine such as N''-[(dimethylamino)(methylimino)methyl]-N,N,N',N'-tetramethyl-guanidine, 1,8-bis-(tetramethyl-guanidino) naphthalene, compounds of the phosphazene type such as N'',N''''',N'''''''-phosphinimylidinetris[N,N,N',N'-tetramethylguanidine], 1,8-bis(tetramethylamino) naphthalene or mixture thereof.

8. The absorbent mixture according to claim 1, comprising:
   A) 1,2-propandiol or 1,3-propandiol in weight percentage comprised between 55% and 65%;
   B) diazabicycloundecene (DBU) in weight percentage comprised between 25% and 35%;
   C) sulfolane in weight percentage comprised between 5% and 15%.

9. A process for the removal of acid gases from a gaseous mixture containing them, said gaseous mixture consisting of natural gas or of an exhaust smoke from a combustion process, the process including the following steps in sequence:
   (a) contacting said gaseous mixture, at a temperature comprised between 0° C. and 70° C. and at a pressure comprised between 50 kPa and 15 MPa, with a solvent system comprising an absorbent mixture as defined in claim 1, to obtain a purified gaseous mixture and a liquid solution comprising at least a part of said acid gases,
   (b) separating the purified gaseous mixture from said liquid solution obtained in step (a),
   c) regenerating the solvent system usable in step (a) and forming a separate gaseous mixture comprising said acid gases, by heating said liquid solution separated in step (b), and
   d) optionally, recycling the regenerated solvent in step (c) to said step (a).

* * * * *